United States Patent
Ando

(10) Patent No.: US 8,477,256 B2
(45) Date of Patent: Jul. 2, 2013

(54) LIQUID CRYSTAL MODULE AND DISPLAY DEVICE

(75) Inventor: Satoshi Ando, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 309 days.

(21) Appl. No.: 12/969,626

(22) Filed: Dec. 16, 2010

(65) Prior Publication Data

US 2011/0149193 A1    Jun. 23, 2011

(30) Foreign Application Priority Data

Dec. 22, 2009   (JP) ................. 2009-290586

(51) Int. Cl.
 *G02F 1/3333*   (2006.01)
(52) U.S. Cl.
 USPC ............................ 349/58; 362/633
(58) Field of Classification Search
 USPC ............. 349/58, 65, 67, 69; 362/97.2, 632, 362/633, 634, 611, 614, 609
 See application file for complete search history.

(56) References Cited

U.S. PATENT DOCUMENTS

| | | | |
|---|---|---|---|
| 2006/0284808 A1* | 12/2006 | Fukuda | 345/89 |
| 2006/0290835 A1* | 12/2006 | Sakuma | 349/58 |
| 2010/0302457 A1 | 12/2010 | Yamamoto et al. | |

FOREIGN PATENT DOCUMENTS

| | | |
|---|---|---|
| EP | 1 382 991 A2 | 1/2004 |
| EP | 1 956 419 A1 | 8/2008 |
| EP | 2 083 313 A1 | 7/2009 |
| EP | 2 103 986 A1 | 9/2009 |
| JP | 2000-137446 A | 5/2000 |
| JP | 2009-175378 A | 8/2009 |

OTHER PUBLICATIONS

European Search Report of corresponding EP Application No. 10 19 6064.9 dated Jul. 5, 2011.
Partial European Search Report of corresponding EP Application No. 10 19 6064.9 dated Apr. 20, 2011.

\* cited by examiner

*Primary Examiner* — Thoi Duong
(74) *Attorney, Agent, or Firm* — Global IP Counselors

(57) ABSTRACT

A liquid crystal module includes a rear frame, a light reflecting sheet, a linear light source, an optical sheet, a liquid crystal panel and a bezel. The rear frame includes a rear plate, a side plate, a top plate and an attachment stepped portion. The side plate extends from a side edge portion of the rear plate forward of the rear frame relative to the rear plate. The top plate extends from a top edge portion of the side plate outward of the rear frame relative to the side plate. The attachment stepped portion is formed at a longitudinal end portion of the top plate. The attachment stepped portion has a bottom plate with a fastener insertion hole. The bottom plate is located rearward of the rear frame relative to the top plate.

11 Claims, 5 Drawing Sheets

LIQUID CRYSTAL MODULE AND DISPLAY DEVICE

CROSS-REFERENCE TO RELATED APPLICATIONS

This application claims priority to Japanese Patent Application No. 2009-290586 filed on Dec. 22, 2009. The entire disclosure of Japanese Patent Application No. 2009-290586 is hereby incorporated herein by reference.

BACKGROUND

1. Field of the Invention

The present invention generally relates to a liquid crystal module. More specifically, the present invention relates to a liquid crystal module that is installed in a display device.

2. Background Information

A conventional liquid crystal module has a rear frame, a light reflecting sheet, a linear light source (e.g., a cold cathode tube), a pair of lamp frames, an optical sheet, a liquid crystal panel and a bezel. The light reflecting sheet and the linear light source are disposed inside the rear frame. The lamp frames are provided along short sides of the rear frame. The optical sheet and the liquid crystal panel are disposed at top end opening of the rear frame. Four edges of the liquid crystal panel are surrounded by the bezel. The rear frame is formed by bending sheet metal into a shallow box shape. The rear frame has a plurality of attachment flanges for attaching the liquid crystal module to a cabinet of an electronic device. The attachment flanges are formed at each of four corners of the rear frame. The attachment flanges are formed by outwardly bending end portions of outer plates of double-walled side plates at a right angle, respectively. The double-walled side plates are formed by bending along long sides of the rear frame in an inverted U shape. Each of the attachment flanges has a fastener insertion hole made by punching.

Meanwhile, with another conventional liquid crystal display device, a concave component is formed in the center of the bottom of a lower frame to increase the mechanical strength of the lower frame, and a power circuit board is attached to the concave component for heat dissipation (see Japanese Laid-Open Patent Application Publication No. 2000-137446, for example). With further another conventional liquid crystal module, a circuit board is disposed at a spaced apart location from a bezel and an outer plate of a double-walled plate between the bezel and the outer plate. The double-walled plate is formed along a long side of a rear frame. Furthermore, these components are fastened together at one or more places, thereby increasing the bezel fixing strength and the grounding of the circuit board (see Japanese Laid-Open Patent Application Publication No. 2009-175378, for example).

SUMMARY

It has been discovered that, with the conventional liquid crystal module, since the attachment flanges are formed by merely bending the end portions of the outer plates of the double-walled side plates outward at a right angle, the attachment flanges are low in strength. Thus, the attachment flanges are susceptible to deformation by vibration or impact during transport. Furthermore, if the attachment flanges deform too much, then the liquid crystal module is difficult to assemble or difficult to attach to the cabinet. Moreover, since the attachment flanges are also susceptible to deformation during the assembly of the liquid crystal module, a problem is that the yield is poor, which leads to higher cost.

Furthermore, it has been also discovered that, even if the concave component is formed in the center of the bottom of the lower frame to increase the mechanical strength of the lower frame as the conventional liquid crystal display device, the strength of the attachment flanges of the rear frame of the conventional liquid crystal module cannot be increased by applying this technique. Moreover, it has been also discovered that, even if the bezel, the circuit board and the outside plate of the double-walled plate of the rear frame are fastened together to increase the strength as the conventional liquid crystal module, the strength of the attachment flanges of the rear frame of the conventional liquid crystal module cannot be increased by applying this technique.

An improved liquid crystal module was conceived in light of the above-mentioned problem. One object of the present disclosure is to provide a liquid crystal module with which strength of an attachment structure of a rear frame can be increased.

In accordance with one aspect of the present disclosure, a liquid crystal module includes a rear frame, a light reflecting sheet, a linear light source, an optical sheet, a liquid crystal panel and a bezel. The rear frame includes a rear plate, a side plate, a top plate and an attachment stepped portion. The side plate extends from a side edge portion of the rear plate forward of the rear frame relative to the rear plate. The top plate extends from a top edge portion of the side plate outward of the rear frame relative to the side plate. The attachment stepped portion is formed at a longitudinal end portion of the top plate. The attachment stepped portion has a bottom plate with a fastener insertion hole. The bottom plate is located rearward of the rear frame relative to the top plate. The light reflecting sheet is disposed on the rear plate of the rear frame. The linear light source is disposed above the light reflecting sheet. The optical sheet is disposed above the linear light source. The liquid crystal panel is disposed above the optical sheet. The bezel is disposed around edge portions of the liquid crystal panel.

With the liquid crystal module, it is possible to provide a liquid crystal module with which strength of an attachment structure of a rear frame can be increased.

These and other objects, features, aspects and advantages will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from these disclosures that the following descriptions of the preferred embodiment are provided for illustration only and not for the purpose of limiting the invention as defined by the appended claims and their equivalents.

Figure 5:
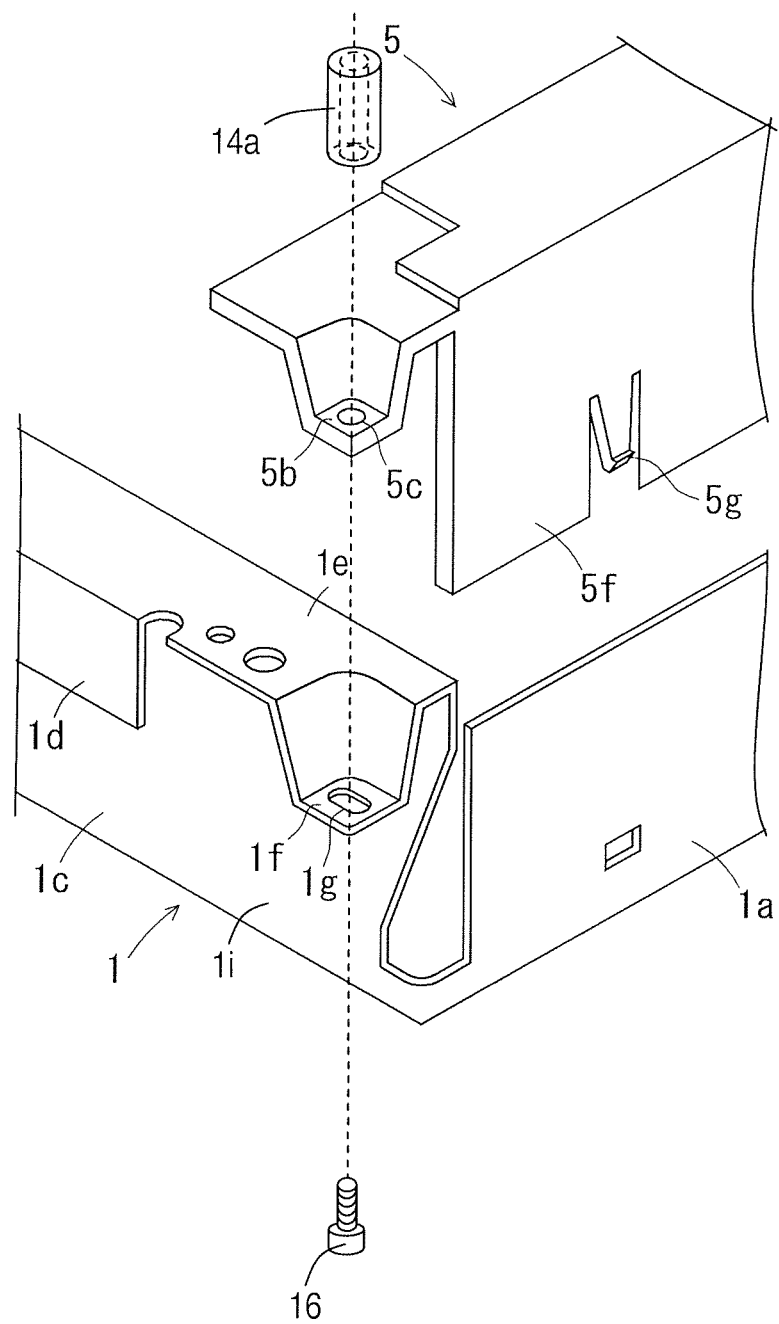
FIG. 5 is an enlarged, partial exploded perspective view of the liquid crystal module illustrating an attachment structure of the liquid crystal module relative to a cabinet of a display device.
Figure 6:
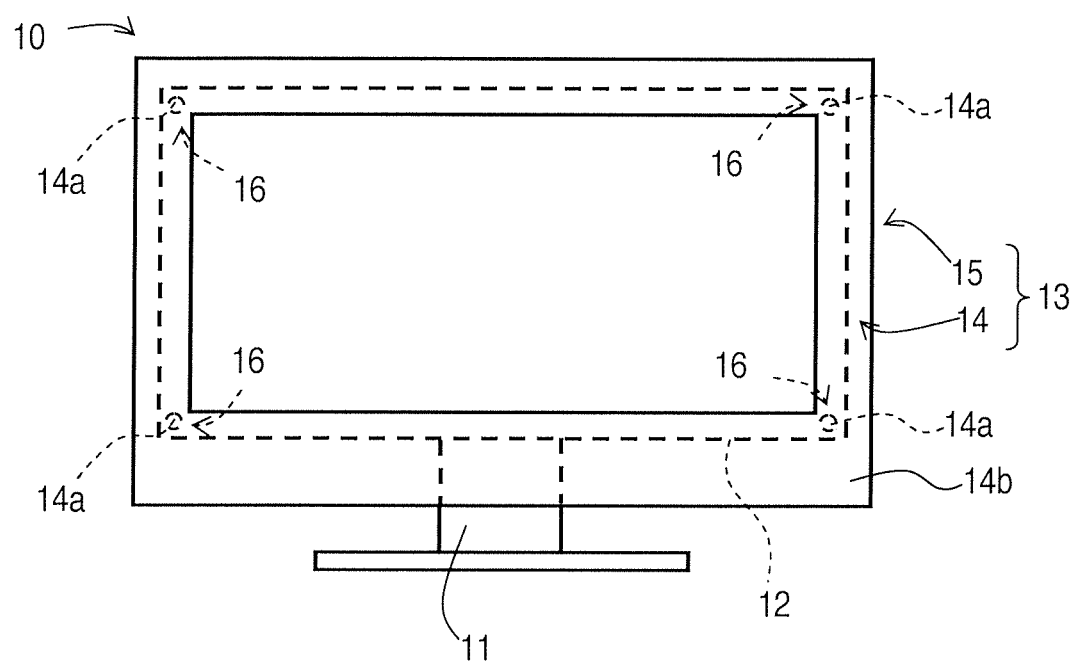
FIG. 6 is a front elevational view of the display device in accordance with one embodiment.

FIG. 5 illustrates a flat panel display device (e.g., display device) 10. The flat panel display device 10 is used as a television set, a computer display, or other display device. The flat panel display device 10 includes a stand 11, a liquid crystal module 12 and a cabinet 13 with front and rear cabinets 14 and 15. The liquid crystal module 12 is fixed on the stand 11. The liquid crystal module 12 is covered with the cabinet 13. Specifically, the liquid crystal module 12 is disposed within an inside space of the cabinet 13 that is defined between the front cabinet 14 and the rear cabinet 15. The stand 11 is fixedly coupled to the cabinet 13. The liquid crystal module 12 is fixedly coupled to the front cabinet 14 with screws 16. The front cabinet 14 is rectangular when viewed from a front side of the flat panel display device 10, and is made of synthetic resin. The front cabinet 14 is integrally formed as a one-piece, unitary member. The front cabinet 14 has four bosses 14a and a front panel 14b. The bosses 14a have threaded holes into which the screws 16 are screwed to fixedly couple the liquid crystal module 12 to the front cabinet 14, respectively. The bosses 14a protrude rearward of the front cabinet 14 relative to the front panel 14b. The rear cabinet 15 is coupled to a rear side of the front cabinet 14, and is made of synthetic resin. The rear cabinet 15 is integrally formed as a one-piece, unitary member.

Figure 1:
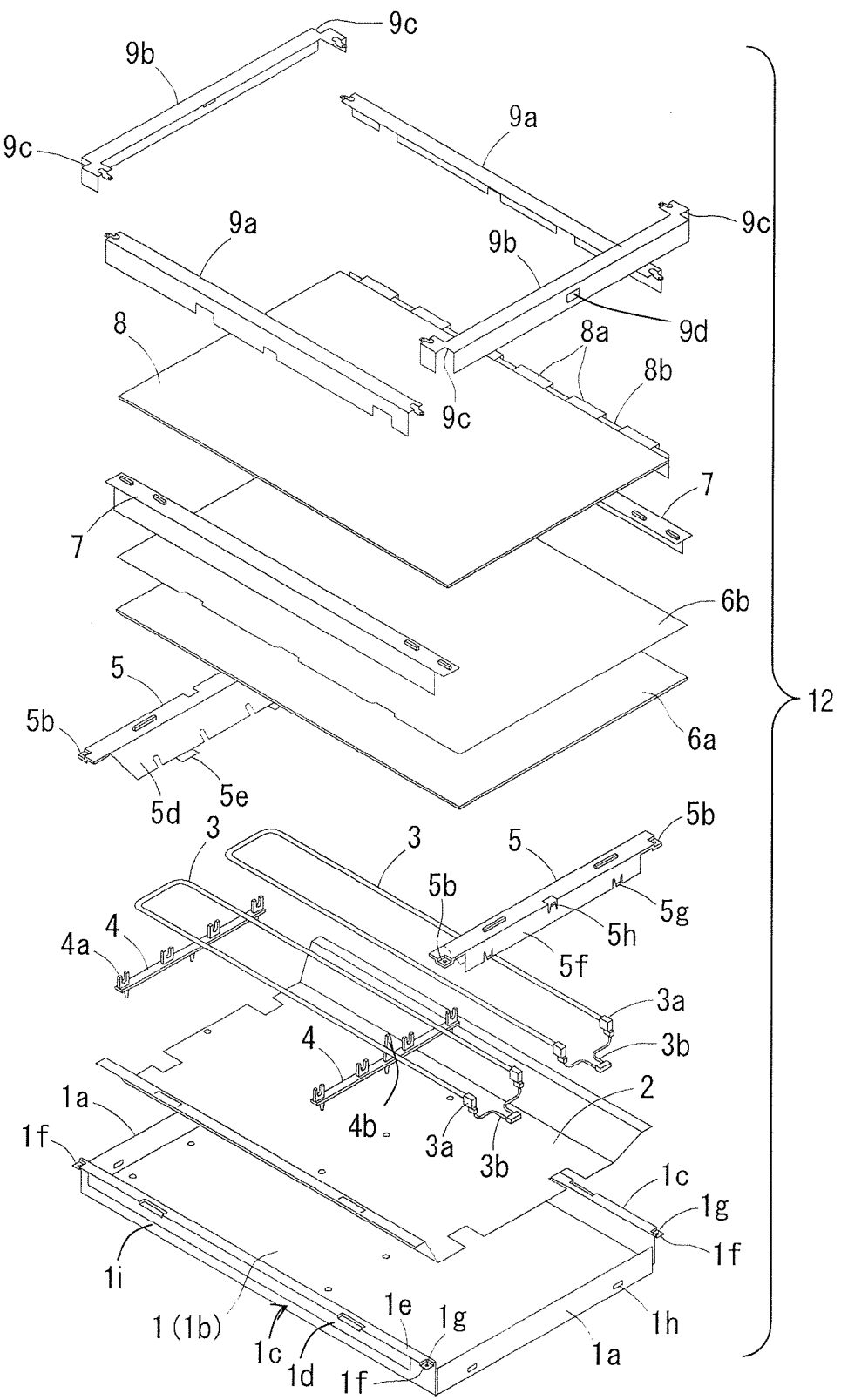
FIG. 1 is an exploded perspective view of a liquid crystal module in accordance with one embodiment.

Referring to FIGS. 1 to 5, the liquid crystal module 12 will be described in detail. As seen in FIG. 1, the liquid crystal module 12 mainly includes a rear frame 1, a light reflecting sheet 2, a pair of U-shaped cold cathode tubes (e.g., light sources) 3, a pair of lamp holders 4, a pair of lamp frames 5, a plurality of optical sheets 6a and 6b, a pair of cell guides 7, a liquid crystal panel 8, and a plurality of bezels 9a and 9b.

The rear frame 1 is a shallow box-shaped frame made by bending sheet metal. The rear frame 1 mainly includes a pair of short side plates 1a, a bottom plate (e.g., rear plate) 1b and a pair of double-walled long side plates (hereinafter "double-walled side plates") 1c. The side plates 1a extends upward (forward) from short side edge portions of the bottom plate 1b relative to the bottom plate 1b. The double-walled side plates 1c extends upward from long side edge portions of the bottom plate 1b. Each of the double-walled side plates 1c includes an inner plate (e.g., side plate) 1i, an upper end flange (e.g., top plate) 1e and an outer plate (e.g., outer side plate) 1d. The inner plates 1i extend upward (forward) from the long side edge portions of the bottom plate 1b relative to the bottom plate 1b. The upper end flanges 1e extend outward at a right angle relative to the inner plates 1i, respectively. The outer plates 1d extend downward (rearward) at a right angle relative to the upper end flanges 1e from outer edge portions (outward edge portions) of the upper end flanges 1e relative to the upper end flanges 1e, respectively.

The light reflecting sheet 2 is provided on the bottom plate 1b inside the rear frame 1. The U-shaped cold cathode tubes 3 are installed in parallel as linear light sources above the light reflecting sheet 2. The U-shaped cold cathode tubes 3 are supported by the lamp holders 4. Each of the lamp holders 4 has a plurality of support components 4a into which the U-shaped cold cathode tubes 3 are fitted and held. One of the lamp holders 4 has a post 4b that holds up the optical sheet 6a from below and prevents sagging. The post 4b is formed on the lamp holder 4 that supports center parts of the U-shaped cold cathode tubes 3.

Lamp sockets 3a are attached to end portions of the U-shaped cold cathode tubes 3. The lamp sockets 3a are fitted into socket fitting openings (not shown) formed in the bottom plate 1b of the rear frame 1 along the short side plate 1a (the right side plate in FIG. 1) on one short side of the rear frame 1. Lead wires 3b of the U-shaped cold cathode tubes 3 are taken out from the lamp sockets 3a to the rear side of the rear frame 1.

The lamp frames 5 are made of a synthetic resin. The lamp frames 5 are disposed above the bottom plate 1b on inside of the short side plates 1a formed on the left and right short sides of the rear frame 1. Curved parts of the U-shaped cold cathode tubes 3 on the opposite side from the end portions are disposed behind one of the lamp frames 5, which prevents uneven brightness at the left and right sides of the display face of the liquid crystal panel 8. The liquid crystal panel 8 is configured to display image on the display face.

Figure 3:
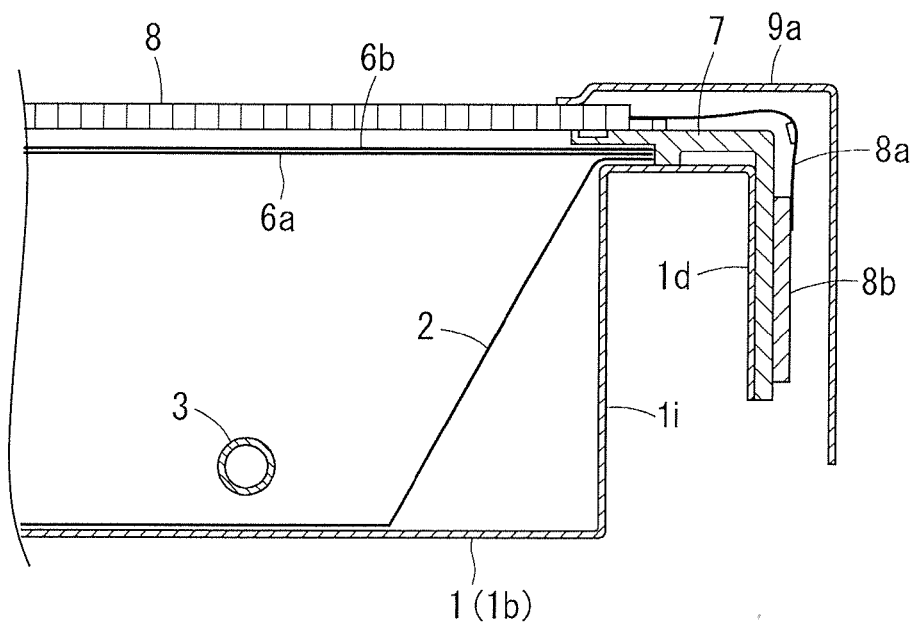
FIG. 3 is a partial cross sectional view of the liquid crystal module taken along III-III line in FIG. 2.
Figure 4:
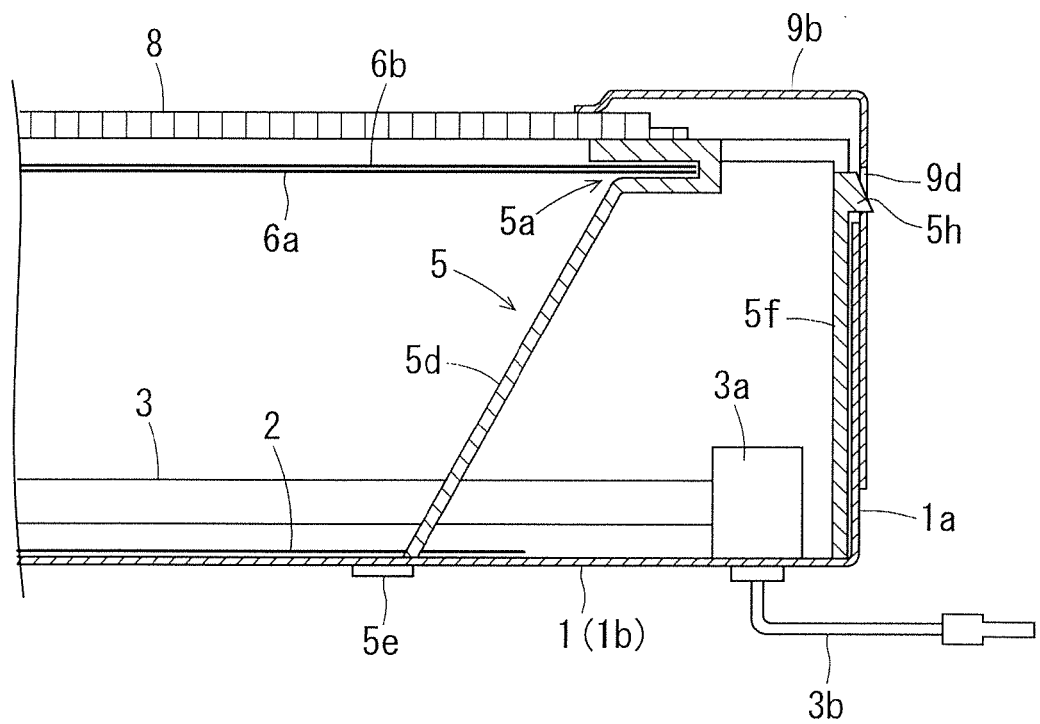
FIG. 4 is a partial cross sectional view of the liquid crystal module taken along IV-IV line in FIG. 2.

The optical sheets (e.g., light diffusing sheets) 6a and 6b are disposed at the upper end opening of the rear frame 1 above the U-shaped cold cathode tubes 3. The end edges along the long sides of the optical sheets 6a and 6b are disposed on the double-walled side plates 1c. The double-walled side plates 1c are formed by bending along the long sides of the rear frame 1 in an inverted U shape. As seen in FIG. 3, the end edges along the long sides of the optical sheets 6a and 6b are held down by the cell guides 7. The cell guides 7 are made of a synthetic resin. Furthermore, as seen in FIG. 4, the end edges along the short sides of the optical sheets 6a and 6b are inserted into grooves 5a formed at the upper ends of the lamp frames 5.

The liquid crystal panel 8 is disposed above the optical sheets 6a and 6b. As seen in FIGS. 3 and 4, the end edges (e.g., edge portions) on the four sides of the liquid crystal panel 8 are disposed on the top faces of the lamp frames 5 and the cell guide 7. Four (two long and two short) bezels 9a and 9b made of sheet metal are linked in a square shape. The bezels 9a and 9b surround the side plates on the four sides of the rear frame 1 and the end edges on the four sides of the liquid crystal panel 8. The bezels 9a and 9b are fixed to the double-walled side plates 1c of the rear frame 1 with screws. As seen in FIGS. 1 and 3, an X-wiring board 8b is connected via a chip-on-film 8a to the end edge of the liquid crystal panel 8, and the X-wiring board 8b is fixed to the side face of the cell guide 7.

As seen in FIGS. 1 and 5, at both ends (e.g., longitudinal end portions) of the double-walled side plates 1c along the long sides of the rear frame 1, the outer plates 1d are partially cut out, leaving behind the upper end flanges 1e. The double-walled side plates 1c are substantially identical to each other. Hereinafter, one of the double-walled side plates 1c will be described in detail for the sake of brevity. Attachment flanges (e.g., attachment stepped portions) 1f are formed at both ends of the upper end flange 1e of the double-walled side plate 1c by drawing the both ends of the upper end flange 1e. Each of the attachment flanges 1f has a bottom plates with an insertion hole (e.g., fastener insertion hole) 1g. The bottom plates of the attachment flanges 1f are located lower than the upper end flange 1e. In other words, the bottom plates of the attachment flanges 1f are located rearward relative to the upper end flange 1e. The attachment flanges 1f are used to attach the assembled liquid crystal module 12 to the front cabinet 14 of the flat panel display device 10. Each of the attachment flanges 1f is formed in a substantially square concave step shape that is open on two sides and forms a corner in between. Each of the attachment flanges 1f has the insertion hole 1g. The insertion hole 1g is punched into a bottom plates of the attachment flange 1f. Since the attachment flanges 1f are formed by drawing, the attachment flanges 1f are far stronger than ones formed merely by bending, and are less prone to deformation. The attachment flanges 1f are formed at a total of four places, one each at the two ends of the double-walled side plates 1c along the opposing long sides of the rear frame 1. As seen in FIG. 5, the attachment flanges 1f are located inward of the rear frame 1 relative to the outer plate 1d, respectively.

Referring to FIG. 5, the lamp frames 5 will be described in detail. As seen in FIG. 5, each of the lamp frames 5 has a pair of mating flanges (e.g., rearward protruding portions) 5b. The mating flanges 5b are formed at end portions (longitudinal end portions) of the lamp frames 5, respectively. The mating flanges 5b are fitted into the attachment flanges 1f. Each of the mating flanges 5b has a bottom portion with a fastener insertion hole 5c. The mating flanges 5b are superposed on the attachment flanges 1f such that the faster insertion holes 5c are concentrically aligned to the insertion holes 1g of the attachment flanges 1f, respectively. The mating flanges 5b and the attachment flanges 1f are fixed together to the front cabinet 14 by the screws 16 (e.g., fasteners). In particular, as seen in FIG. 5, the screws 16 are inserted through the fastener insertion holes 1g of the attachment flanges 1f and the fastener insertion holes 5c of the mating flanges 5b from below. The bosses 14a are fitted into the mating flanges 5b, respectively. Then, the screws 16 are threaded into the threaded holes of the bosses 14a of the front cabinet 14 to fixedly couple the liquid crystal module 12 to the cabinet 13. As seen in FIGS. 1, 4 and 5, each of the lamp frames 5 further has a front face inclined plate 5d, rear face plate 5f, a pair of engagement tabs 5e, a pair of lower engagement prongs 5g and an upper engagement prong 5h. The engagement tabs 5e are formed at lower edge portion of the front face inclined plate 5d. The lower engagement prongs 5g are formed on the rear face plates 5f. The upper engagement prong 5h is formed at an upper center portion of the rear face plate 5f. As seen in FIG. 4, the engagement tabs 5e are engaged with engagement holes formed in the bottom plate 1b of the rear frame 1. Furthermore, as seen in FIG. 5, the lower engagement prongs 5g are engaged with engagement holes 1h formed in the side plates 1a of the rear frame 1. With this arrangement, the lamp frames 5 are attached to the side plates 1a of the rear frame 1 such that the lamp frames 5 are disposed inside of the side plates 1a of the rear frame 1.

Figure 2:
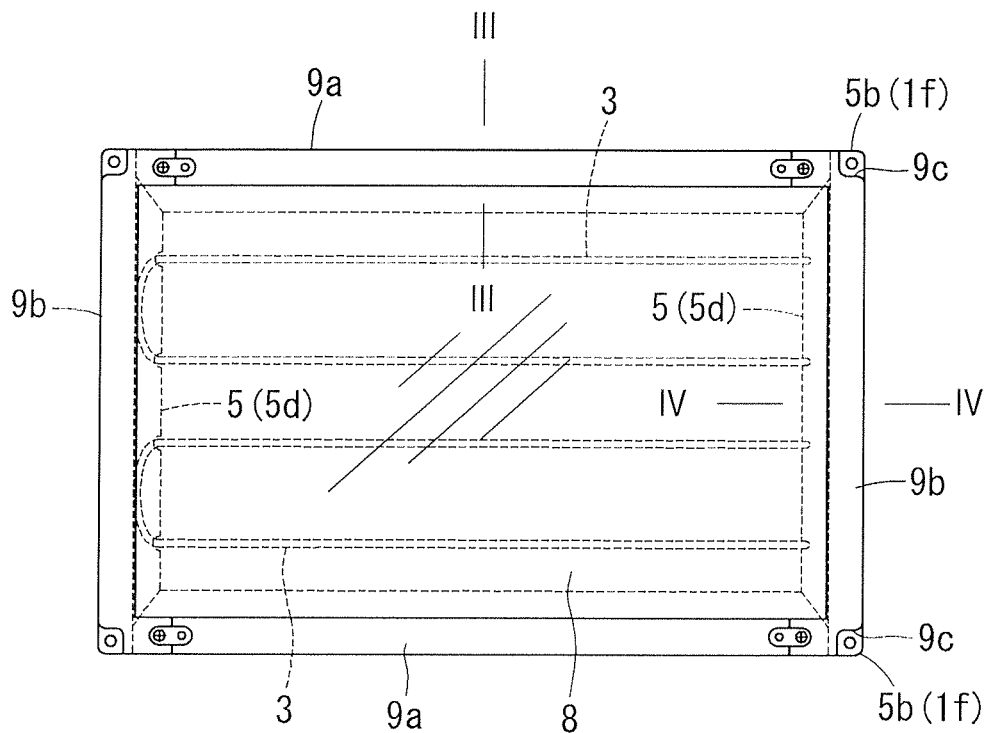
FIG. 2 is a front elevational view of the liquid crystal module illustrated in FIG. 1.

Also, as seen in FIGS. 1 and 2, each of the short bezels 9b has a pair of recesses 9c. The recesses 9c are formed at end portions of each of the short bezels 9b, respectively. The recesses 9c avoid the attachment flanges 1f of the rear frame 1 into which the mating flanges 5b of the lamp frames 5 have been fitted. The end portions of short bezels 9b are bent at a right angle toward the long bezels 9a. The recesses 9c are formed at two corners of each of the short bezels 9b. The recesses 9c are aligned with the insertion holes of the attachment flanges 1f as viewed from a center axis of the insertion hole 1g of the attachment flanges 1f. The short bezels 9b are superposed at both ends over both ends of the long bezels 9a and are screwed to the double-walled side plates 1c of the rear frame 1. As seen in FIG. 4, the engagement prongs 5h are engaged with engagement holes 9d formed in side faces of the short bezels 9b to complete the attachment.

With the liquid crystal module 12, since the strength of the lower attachment flanges 1f is formed by drawing at the upper end flanges 1e at both ends of the double-walled side plates 1c along the long sides of the rear frame 1, the strength of the lower attachment flanges 1f is far higher than that of a conventional attachment flange forced by bending. Furthermore, the attachment flanges 1f are less likely to be deformed by vibration or impact during transport. Thus, the work of assembling the liquid crystal module 12 and the work of attaching it to the cabinet 13 can be carried out easily and correctly. Moreover, since the attachment flanges 1f are also less likely to be deformed during the assembly of the liquid crystal module 12, the yield is better and the cost can be effectively reduced.

Also, since the mating flanges 5b at the ends of the lamp frames 5 are fitted into the attachment flanges 1f produced by drawing, the positioning and attachment of the lamp frames are easier, and attachment looseness is less likely to occur. Also, since the recesses 9c that avoid the attachment flanges 1f are formed at both ends of the short bezels 9b, the short bezels 9b will not get in the way during attachment to the cabinet 13 of the flat panel display device 10, so an advantage is that the attachment work is easier.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While a preferred embodiment have been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A liquid crystal module comprising:
   a rear frame including
      a rear plate,
      a side plate that extends from a side edge portion of the rear plate in a forward direction of the rear frame relative to the rear plate,
      a top plate that extends from a top edge portion of the side plate outward of the rear frame relative to the side plate, the top plate having a first top surface that faces in the forward direction, and
      an attachment stepped portion that is formed at a longitudinal end portion of the top plate, the attachment stepped portion having a bottom plate with a fastener insertion hole, the bottom plate being located rearward of the rear frame relative to the top plate, the bottom plate having a second top surface that faces in the forward direction, the second top surface of the bottom plate being recessed with respect to the first top surface of the top plate;
a light reflecting sheet disposed on the rear plate of the rear frame;
a light source disposed above the light reflecting sheet;
an optical sheet disposed above the light source;
a liquid crystal panel disposed above the optical sheet; and
a bezel disposed around edge portions of the liquid crystal panel.

2. A liquid crystal module comprising:
a rear frame including
   a rear plate,
   a side plate that extends from a side edge portion of the rear plate forward of the rear frame relative to the rear plate,
   a top plate that extends from a top edge portion of the side plate outward of the rear frame relative to the side plate, and
   an attachment stepped portion that is formed at a longitudinal end portion of the top plate, the attachment stepped portion having a bottom plate with a fastener insertion hole, the bottom plate being located rearward of the rear frame relative to the top plate;
a light reflecting sheet disposed on the rear plate of the rear frame;
a light source disposed above the light reflecting sheet;
an optical sheet disposed above the light source;
a liquid crystal panel disposed above the optical sheet;
a bezel disposed around edge portions of the liquid crystal panel; and
a lamp frame disposed above the rear plate of the rear frame, the lamp frame having a rearward protruding portion at a longitudinal end portion of the lamp frame, the rearward protruding portion being fitted to the attachment stepped portion of the rear frame.

3. The liquid crystal module according to claim 2, wherein the rearward protruding portion of the lamp frame has a bottom portion with a fastener insertion hole, the fastener insertion hole of the rearward protruding portion of lamp frame being concentrically aligned with the fastener insertion hole of the bottom plate of the attachment stepped portion of the rear frame.

4. A display device comprising:
a cabinet including a front cabinet and a rear cabinet, the front cabinet having a front panel and a boss with a threaded hole, the boss protruding rearward of the front cabinet relative to the front panel;
the liquid crystal module according to claim 2; and
a screw disposed through the faster insertion hole of the attachment stepped portion of the rear frame, the screw being further fastened to the threaded hole of the boss of the cabinet such that the liquid crystal module is fixedly coupled to the cabinet.

5. The display device according to claim 4, wherein the rearward protruding portion of the lamp frame has a bottom portion with a fastener insertion hole, the fastener insertion hole of the rearward protruding portion of lamp frame being concentrically aligned with the fastener insertion hole of the bottom plate of the attachment stepped portion of the rear frame.

6. The display device according to claim 5, wherein the boss of the cabinet is fitted to the rearward protruding portion of the lamp frame such that the threaded hole of the boss is concentrically aligned with the faster insertion hole of the rearward protruding portion of the lamp frame, and
the screw is further disposed through the faster insertion hole of the rearward protruding portion of the lamp frame.

7. A liquid crystal module comprising:
a rear frame including
   a rear plate,
   a side plate that extends from a side edge portion of the rear plate forward of the rear frame relative to the rear plate,
   a top plate that extends from a top edge portion of the side plate outward of the rear frame relative to the side plate, and
   an attachment stepped portion that is formed at a longitudinal end portion of the top plate, the attachment stepped portion having a bottom plate with a fastener insertion hole, the bottom plate being located rearward of the rear frame relative to the top plate;
a light reflecting sheet disposed on the rear plate of the rear frame;
a light source disposed above the light reflecting sheet;
an optical sheet disposed above the light source;
a liquid crystal panel disposed above the optical sheet; and
a bezel disposed around edge portions of the liquid crystal panel, the bezel having a recess at a corner portion of the bezel, the recess being aligned with the fastener insertion hole of the attachment stepped portion of the rear frame as viewed from a center axis of the faster insertion hole of the attachment stepped portion of the rear frame.

8. A display device comprising:
a cabinet including a front cabinet and a rear cabinet, the front cabinet having a front panel and a boss with a threaded hole, the boss protruding rearward of the front cabinet relative to the front panel;
the liquid crystal module according to claims 7; and
a screw disposed through the faster insertion hole of the attachment stepped portion of the rear frame, the screw being further fastened to the threaded hole of the boss of the cabinet such that the liquid crystal module is fixedly coupled to the cabinet.

9. A liquid crystal module comprising:
a rear frame including
   a rear plate,
   a side plate that extends from a side edge portion of the rear plate forward of the rear frame relative to the rear plate,
   a top plate that extends from a top edge portion of the side plate outward of the rear frame relative to the side plate,
   an outer side plate that extends from an outward edge portion of the top plate rearward of the rear frame relative to the top plate, and
   an attachment stepped portion that is formed at a longitudinal end portion of the top plate, the attachment stepped portion having a bottom plate with a fastener insertion hole, the bottom plate being located rearward of the rear frame relative to the top plate, the attachment stepped portion of the rear frame being located inward of the rear frame relative to the outer side plate of the rear frame;
a light reflecting sheet disposed on the rear plate of the rear frame;
a light source disposed above the light reflecting sheet;
an optical sheet disposed above the light source;
a liquid crystal panel disposed above the optical sheet; and a bezel disposed around edge portions of the liquid crystal panel.

10. A display device comprising:
a cabinet including a front cabinet and a rear cabinet, the front cabinet having a front panel and a boss with a threaded hole, the boss protruding rearward of the front cabinet relative to the front panel;
the liquid crystal module according to claim 9; and
a screw disposed through the faster insertion hole of the attachment stepped portion of the rear frame, the screw being further fastened to the threaded hole of the boss of the cabinet such that the liquid crystal module is fixedly coupled to the cabinet.

11. A display device comprising:
a cabinet including a front cabinet and a rear cabinet, the front cabinet having a front panel and a boss with a threaded hole, the boss protruding rearward of the front cabinet relative to the front panel;
a liquid crystal module housed within the cabinet, the liquid crystal module including
a rear frame having
a rear plate,
a side plate that extends from a side edge portion of the rear plate in a forward direction of the rear frame relative to the rear plate,
a top plate that extends from a top edge portion of the side plate outward of the rear frame relative to the side plate, the top plate having a first top surface that faces in the forward direction, and
an attachment stepped portion that is formed at a longitudinal end portion of the top plate, the attachment stepped portion having a bottom plate with a fastener insertion hole, the bottom plate being located rearward of the rear frame relative to the top plate, the bottom plate having a second top surface that faces in the forward direction, the second top surface of the bottom plate being recessed with respect to the first top surface of the top plate,
a light reflecting sheet disposed on the rear plate of the rear frame,
a light source disposed above the light reflecting sheet,
an optical sheet disposed above the light source,
a liquid crystal panel disposed above the optical sheet, and
a bezel disposed around edge portions of the liquid crystal panel; and
a screw disposed through the faster insertion hole of the attachment stepped portion of the rear frame, the screw being further fastened to the threaded hole of the boss of the cabinet such that the liquid crystal module is fixedly coupled to the cabinet.

* * * * *